US011886603B2

(12) United States Patent
Malliah et al.

(10) Patent No.: US 11,886,603 B2
(45) Date of Patent: Jan. 30, 2024

(54) SYSTEM AND METHOD FOR MULTI-PARTY ELECTRONIC SIGNING OF ELECTRONIC DOCUMENTS

(71) Applicant: The Toronto-Dominion Bank, Toronto (CA)

(72) Inventors: Avinash Malliah, Toronto (CA); Gregory Boddison, Toronto (CA); Angelique Louise Carle, Sutton West (CA)

(73) Assignee: The Toronto-Dominion Bank, Toronto (CA)

( * ) Notice: Subject to any disclaimer, the term of this patent is extended or adjusted under 35 U.S.C. 154(b) by 609 days.

(21) Appl. No.: 16/035,945

(22) Filed: Jul. 16, 2018

(65) Prior Publication Data
US 2020/0019715 A1     Jan. 16, 2020

(51) Int. Cl.
*H04L 29/00* (2006.01)
*G06F 21/62* (2013.01)
*G06F 21/64* (2013.01)
*H04L 9/32* (2006.01)
*G06F 16/176* (2019.01)

(52) U.S. Cl.
CPC ........ *G06F 21/6209* (2013.01); *G06F 16/176* (2019.01); *G06F 21/64* (2013.01); *H04L 9/3247* (2013.01)

(58) Field of Classification Search
CPC .......... G06F 21/6209; G06F 17/30165; G06F 21/64; G06F 21/30; G06F 21/44; G06F 21/70; H04L 9/3247; H04L 63/08; H04L 63/10
See application file for complete search history.

(56) References Cited

U.S. PATENT DOCUMENTS 8,321,680 B2    11/2012  Gantman et al.
8,589,693 B2    11/2013  Barthelemy et al.
(Continued)

OTHER PUBLICATIONS

ESignLive, eSignLive How To: Creating a Signing Workflow, 2018, Located via:Internet (Google, Google Scholar): Technical Literature Search, Download URL:https://www.esignlive.com/blog/esignlive-creating-signing-workflow/.
(Continued)

*Primary Examiner* — Jeffrey C Pwu
*Assistant Examiner* — Helai Salehi
(74) *Attorney, Agent, or Firm* — Rowand LLP (57) ABSTRACT

A method for signing an electronic document is disclosed. The method includes: receiving, from a first client device: a first electronic document in a first state, the first electronic document containing first data in the first state; a first indication of approval for the first electronic document in the first state; and a selection of one or more second client devices; sending, to each of the one or more second client devices, an invite to access the first electronic document in the first state, each invite including a link to access the first electronic document; receiving, from at least one of the one or more second client devices, a second indication of approval for the first electronic document in the first state; validating the second indications of approval; in response to the validating, submitting a locked form version of the first electronic document to a virtual document signing ceremony.

16 Claims, 6 Drawing Sheets

(56) References Cited

U.S. PATENT DOCUMENTS

| | | | |
|---|---|---|---|
| 8,655,961 | B2 | 2/2014 | McCabe et al. |
| 9,286,596 | B2 | 3/2016 | Leoutsarakos et al. |
| 9,547,879 | B1 | 1/2017 | Rakowicz et al. |
| 10,108,812 | B2 * | 10/2018 | Ansari ............... G06F 21/64 |
| 2007/0118732 | A1 | 5/2007 | Whitmore |
| 2009/0094460 | A1 | 4/2009 | Dedek |
| 2010/0128291 | A1 * | 5/2010 | Vendrow ............ G06F 21/64 358/1.9 |
| 2010/0318369 | A1 * | 12/2010 | Nambiar .......... G06Q 30/0635 705/1.1 |
| 2012/0278401 | A1 * | 11/2012 | Meisels ............ G06Q 10/101 709/206 |
| 2015/0295922 | A1 * | 10/2015 | Dunn ................. G06F 21/32 713/176 |
| 2016/0179776 | A1 | 6/2016 | Bartley et al. |
| 2017/0011483 | A1 | 1/2017 | Gatenio |

OTHER PUBLICATIONS

Agree'nSign, Located via:Internet (Google, Google Scholar): Technical Literature Search, 2018, Download URL: https://www.agreensign.com/faq.

Docusign, "Nitro Pro for DocuSign Signature Appliance", 2018, Located via Internet (Google, Google Scholar): Technical Literature Search, Download URL:https://www.docusign.com/partner/nitro-pro-for-cosign-central.

* cited by examiner

SYSTEM AND METHOD FOR MULTI-PARTY ELECTRONIC SIGNING OF ELECTRONIC DOCUMENTS

TECHNICAL FIELD

The present disclosure relates to management of electronic documents and, in particular, to systems and methods for processing multi-party electronic signatures for electronic documents.

BACKGROUND

Electronic signatures may usefully provide expressions of agreement or consent by interested parties for an electronic document. Often, a consensus may be required among the interested parties to authorize execution of a certain action (e.g. executing a contract, authorizing a financial transaction, etc.). When the parties are remotely located and large in number, it is difficult to authenticate the parties and coordinate an electronic signing procedure for a document that also contemplates individual actions, such as edits or changes to the document, initiated by any of the parties.

BRIEF DESCRIPTION OF DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

In one aspect, the present disclosure describes a computing device. The computing device includes a memory, a communications module that is communicable with an external network, and a processor coupled to the memory and the communications module. The processor is configured to: receive, from a first client device: a first electronic document in a first state, the first electronic document containing first data in the first state; a first indication of approval for the first electronic document in the first state; and a selection of one or more second client devices; send, to each of the one or more second client devices, an invite to access the first electronic document in the first state, each invite including a link to access the first electronic document; receive, from at least one of the one or more second client devices, a second indication of approval for the first electronic document in the first state; validate the second indications of approval; and in response to the validating, submit a locked form version of the first electronic document to a virtual document signing ceremony.

In another aspect, the present disclosure describes a method of signing an electronic document. The method includes: receiving, from a first client device: a first electronic document in a first state, the first electronic document containing first data in the first state; a first indication of approval for the first electronic document in the first state; and a selection of one or more second client devices; sending, to each of the one or more second client devices, an invite to access the first electronic document in the first state, each invite including a link to access the first electronic document; receiving, from at least one of the one or more second client devices, a second indication of approval for the first electronic document in the first state; validating the second indications of approval; in response to the validating, submitting a locked form version of the first electronic document to a virtual document signing ceremony.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In an aspect, the present application discloses a system for processing electronic signatures. More specifically, a platform for facilitating multi-party signing of electronic documents is disclosed. The platform of the present disclosure may include an electronic signatures platform (ESP) designed to enable secure authentication of client devices associated with users, verification of the users' expressed agreement to a document, and electronic signing of the document by the users. The ESP may, for example, be implemented as an intermediary between multiple parties associated with a document (e.g. contract, purchase order, etc.) that is capable of obtaining an expression of the parties' agreement and/or authorization, by means of electronic signatures. The proposed platform may promote enhanced security by ensuring that only authenticated parties are able to access an electronic document for signing. In accordance with embodiments of the present disclosure, the platform may restrict access to an electronic document by defining and assigning permissions for various tasks relating to the document (such as creating, editing, and deleting) to users that are parties to the document.

The ESP of the present application may facilitate communication between remotely located client devices corresponding to multiple different parties to an electronic document. The ESP may communicate with multiple client devices over computer networks and allow the devices to collaborate on the processing of documents and electronic signatures data. In particular, various implementations of the ESP as disclosed herein may be configured to handle transmission of digital consent and signatures data to and from remote client devices in order to process and finalize party consensus relating to electronic documents.

Furthermore, the proposed ESP may allow dynamic updating of electronic documents based on parties' expressions of approval (or consent, agreement, etc.) of the documents. In particular, electronic documents may be updated with signature data provided to the ESP by parties using their respective devices. When a live document (i.e. document that is yet to be finalized or signed) is edited by a party using a user device, the approval of other parties to the edited document may need to be obtained anew. The ESP of the present disclosure facilitates the process of updating electronic documents with changes made by one or more interested parties and re-obtaining party consensus to the documents following the changes in real-time.

Figure 1:
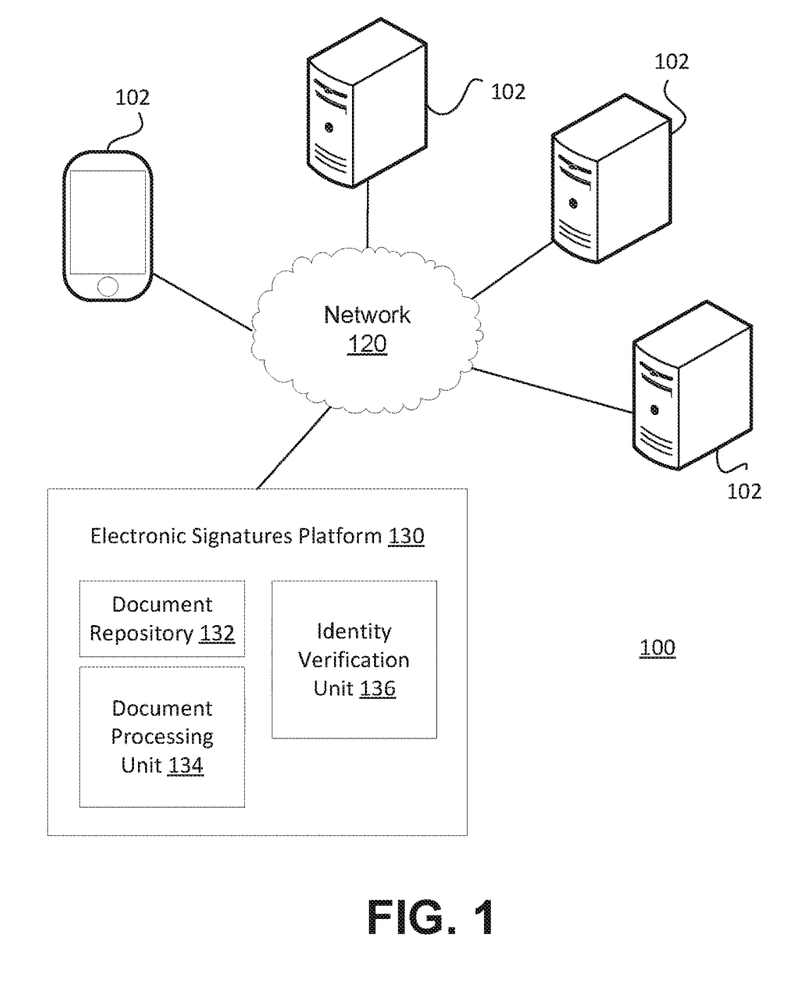
FIG. 1 is a schematic diagram illustrating an operating environment of an example embodiment.

Reference is first made to FIG. 1, which shows an exemplary operating environment in accordance with embodiments of the present disclosure. FIG. 1 illustrates an exemplary system 100 for facilitating electronic signatures between users. More specifically, the system 100 may implement, among others, processes for authenticating client devices, obtaining multi-party approval of electronic documents, and managing electronic signature data.

The system 100 includes a plurality of electronic devices 102. Each electronic device 102 is a computer system. In some embodiments, the electronic device 102 may be a portable electronic device. For example, the electronic device 102 may, as illustrated, be a smartphone. The electronic device 102 may be a computing device of another type such as a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments. In some embodiments, the electronic device 102 may include a smart card, chip card, integrated circuit card (ICC), and/or other card having an embedded integrated circuit.

The electronic device 102 is configured to execute software, such as a documents processing application 104 (not shown). A documents processing application 104 may, for example, be a web application (e.g. single-page application, or SPA), a mobile application, or a desktop application. The documents processing application 104 may be an app for requesting and gaining access to various electronic documents, such as fillable forms, contracts, etc., located at specific locations (e.g. remote server). In at least some embodiments, the documents processing application 104 may request a third-party service to perform authentication on its behalf. For example, the documents processing application 104 may have a credential that must be authenticated for the application to be granted permission to access an electronic document. The documents processing application 104 may have an identifier uniquely identifying the application and the user device with which it is associated.

The network 120 is a computer network. The network 120 allows computer systems in communication therewith to communicate. For example, as illustrated, the network 120 may allow the electronic devices 102 to communicate with an electronic signatures platform (ESP) 130.

The ESP 130 is implemented as part of a computer system. The ESP 130 may be implemented by one or more computing devices such as, for example, database servers, computer servers, and the like. The computing devices may be in communication with each other using the network 120. Alternatively, the computing devices may communicate using another network such as, for example, a local-area network (LAN). In some embodiments, the ESP 130 may be implemented by multiple computing devices organized in a tiered arrangement (e.g. middle-tier and back-end computing devices). In some embodiments, the ESP 130 may be provided by a cluster formed of a plurality of interoperating computing devices.

The ESP 130 may handle various services relating to user/client devices authentication, electronic documents processing, and signature data management. FIG. 1 illustrates a plurality of defined components that may be included as part of the ESP 130: documents repository 132, document processing unit 134, and identity verification unit 136. Each of these components may be rendered by independent computer systems, or alternatively, one or more of the components may be implemented by the same computer system. Furthermore, one or more of the components may be performed or offered together in the ESP 130.

The documents repository 132 stores electronic documents. The documents repository 132 may be populated with various different types of documents, such as fillable forms, contracts, consents, terms of use/service, and electronic authorization forms. Documents may be added to or removed from the documents repository 132. For example, a user that wishes to obtain agreement to and digital execution of a document by multiple different parties may upload such document to the documents repository 132.

The identity verification unit 136 provides authentication and verification services. Specifically, the identity verification unit 136 may authenticate a user of an electronic device 102 based on verifying user and/or client credentials received from the electronic device 102. The identity verification unit 136 may enforce multi-factor authentication policies (if the user has not already been authenticated), and may maintain a record of authenticated users. The identity verification unit 136 may facilitate controlling user access to documents that are stored in the documents repository 132. In particular, the identity verification unit 136 may enable limiting access to documents of the documents repository 132 to only the user devices that have express permission to access those documents. For example, the identity verification unit 136 may contain or have access to a database specifying users that are permitted to access, edit, and/or sign one or more of the documents stored in the documents repository 132.

The document processing unit 134 handles creation, editing, and electronic signing of documents. The document processing unit 134 may be configured to manage requests to obtain multi-party approval for electronic documents, process changes and edits to electronic documents, and update documents based on electronic signature data transmitted from one or more client devices. In at least some embodiments, the document processing unit 134 may maintain multiple copies of an electronic document. For example, the document processing unit 134 may store, at least, an original of an electronic document, editable copies of the document, and/or locked form version of the document.

Figure 2:
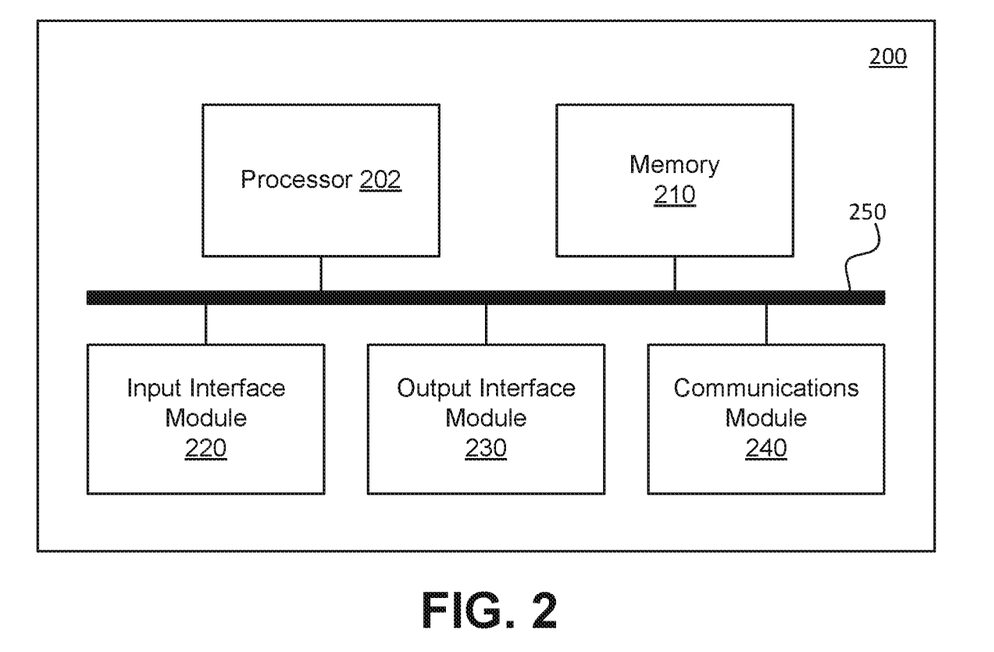
FIG. 2 is a high-level operation diagram of an example computing system for implementing example embodiments of an electronic signature platform.

FIG. 2 is a high-level operation diagram of an example computing system 200 that is configured to implement an ESP 130. The computing system 200 of FIG. 2 includes a variety of modules. For example, as illustrated, the computing system 200 may include a processor 202, a memory 210, an input interface module 220, an output interface module 230, and a communications module 240. As illustrated, the foregoing example modules of the computing system 200 are in communication over a bus 250.

The processor 202 is a hardware processor. Processor 202 may, for example, be one or more ARM, Intel x86, PowerPC processors or the like.

The memory 210 allows data to be stored and retrieved. The memory 210 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the electronic device 102.

The input interface module 220 allows the computing system 200 to receive input signals. Input signals may, for example, correspond to input received from a user. The input interface module 220 may serve to interconnect the computing system 200 with one or more input devices. Input signals may be received from input devices by the input interface module 220. Input devices may, for example, include one or more of a touchscreen input, keyboard, trackball or the like. In some embodiments, all or a portion of the input interface module 220 may be integrated with an input device. For example, the input interface module 220 may be integrated with one of the aforementioned example input devices.

The output interface module 230 allows the computing system 200 to provide output signals. Some output signals may, for example allow provision of output to a user. The output interface module 230 may serve to interconnect the computing system 200 with one or more output devices. Output signals may be sent to output devices by output interface module 230. Output devices may include, for example, a display screen such as, for example, a liquid crystal display (LCD), a touchscreen display. Additionally or alternatively, output devices may include devices other than screens such as, for example, a speaker, indicator lamps (such as for, example, light-emitting diodes (LEDs)), and printers. In some embodiments, all or a portion of the output interface module 230 may be integrated with an output device. For example, the output interface module 230 may be integrated with one of the aforementioned example output devices.

The communications module 240 allows the computing system 200 to communicate with other electronic devices and/or various communications networks. For example, the communications module 240 may allow the computing system 200 to send or receive communications signals. Communications signals may be sent or received according to one or more protocols or according to one or more standards. For example, the communications module 240 may allow the computing system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 240 may allow the computing system 200 to communicate using near-field communication (NFC), via Wi-Fi™, using Bluetooth™ or via some combination of one or more networks or protocols. Contactless payments may be made using NFC. In some embodiments, all or a portion of the communications module 240 may be integrated into a component of the computing system 200. For example, the communications module may be integrated into a communications chipset.

Software comprising instructions is executed by the processor 202 from a computer-readable medium. For example, software may be loaded into random-access memory from persistent storage of memory 210. Additionally or alternatively, instructions may be executed by the processor 202 directly from read-only memory of memory 210.

Figure 3:
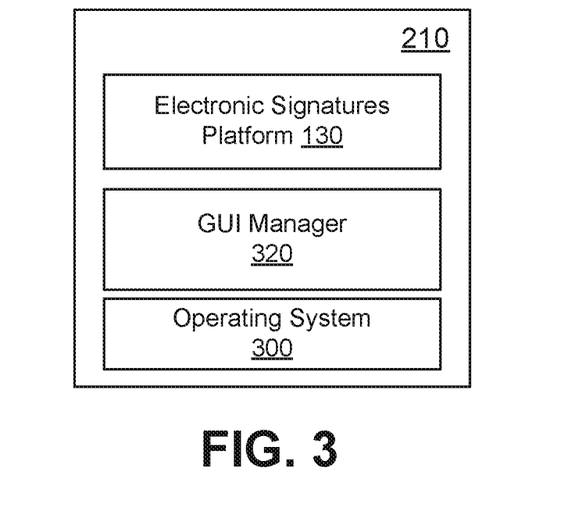
FIG. 3 depicts a simplified software organization of the example computing system of FIG. 2.

FIG. 3 depicts a simplified organization of software components stored in memory 210 of the computing system 200. As illustrated, these software components include an operating system 300, an ESP 130, and a graphical user interface manager 320.

The operating system 300 is software. The operating system 300 allows the ESP 130 to access the processor 202, the memory 210, the input interface module 220, the output interface module 230 and the communications module 240. The operating system 300 may be, for example, Apple iOS™, Google™ Android™, Linux™, Microsoft™ Windows™, or the like.

The graphical user interface manager 320 manages information that may be displayed on user devices associated with parties to an electronic document. When a party gains access to an electronic document by using its device, it is desirable to display information about the document that is specifically tailored for that party. For example, a party to a document may wish to view, among others, a detailed log of its previous edits to a particular document, changes made to a document since the party's most recent approval of the document, or signatures obtained for a document at a particular point in time. The graphical user interface manager 320 may determine the document data which is to be displayed for parties that request access to and display of electronic documents. That is, for each of one or more user devices gaining access to an electronic document, the graphical user interface manager 320 may determine document display data that should be rendered for the user device, at a time requested by a party associated with the user device.

Figure 4:
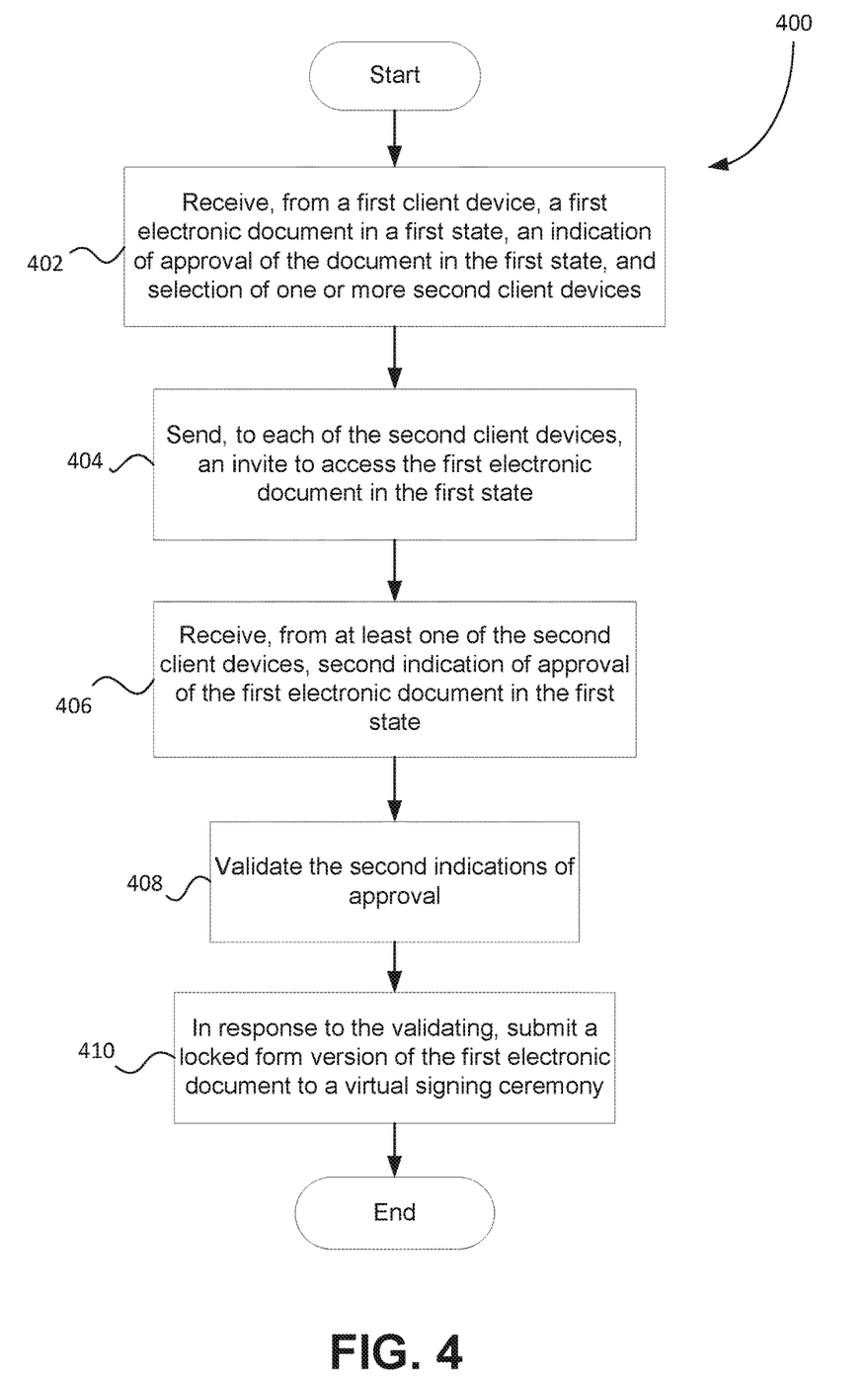
FIG. 4 shows, in flowchart form, an example method for facilitating multi-party signing of an electronic document.

Reference is made to FIG. 4, which shows, in flowchart form, an example method 400 for obtaining multi-party signatures for an electronic document. The method 400 may be performed by a computing system implementing an electronic signatures platform (such as ESP 130). The computing system may be communicably coupled to a plurality of client devices corresponding to interested parties to an electronic document. The computing system functions as an intermediary between the client devices, facilitating authenticated requests by the client devices to access or edit the electronic document and obtain signatures for the document from the interested parties.

In operation 402, the computing system receives, from a first client device, a first electronic document in a first state. The first electronic document may have been obtained by the first client device from a remote resource (e.g. an online documents repository) or generated by a user of the first client device. The first electronic document contains first data in the first state. More specifically, the first state of the first electronic document is a state in which the first data defines the content of the first electronic document. The first data may, for example, comprise original content included at the time of creation of the first electronic document and/or data inputted by a user associated with the first client device.

In addition to the first electronic document, the computing system receives, from the first client device, a first indication of approval for the first electronic document in the first state and a selection of one or more second client devices. An indication of approval may signal, for example, a party's agreement, consent, or support for the state (e.g. document content, format, etc.) of a particular document. The first indication of approval may be a message, notification, or other form that is suitable for transmission from the client device. For example, the first indication of approval may be a tag or metadata that is included with the first electronic document. In some embodiments, the first indication of approval may specify the first state as the state in which the approval of the first electronic document was granted by a party.

The selection of the one or more second client devices identifies the user devices associated with those parties that may have an interest in a particular electronic document. The selection may also specify the users associated with the second client devices that are authorized to access and approve the electronic document. By way of example, the one or more second client devices may be associated with parties to a contractual agreement, entities providing a collective authorization for a transaction, or individuals inputting data into a fillable document. In this way, a user associated with the first client device can invite other interested parties to collaborate on reviewing, editing, approving, and signing the first electronic document.

In order to use the services rendered by the ESP, a user associated with the first client device may need to be authenticated. The user may need to present, to the computing system, her credentials as well as permissions to either upload a document to the ESP or access a document that is already available in the ESP for the purpose of sharing the document to interested parties for collaboration. Alternatively, the user's permission level may be accessed from the database upon presenting the credentials (e.g. login, pin, etc.).

In operation 404, the computing system sends, to each of the one or more second client devices in the selection, an invite to access the first electronic document in the first state. Each invite includes a link for accessing the first electronic document. For example, the link may point to an online repository location where the first electronic document can be viewed, edited, and/or signed. Alternatively, the link may re-direct to a location from which the first electronic document can be downloaded and saved locally on a client device.

Prior to sending the invites to the second client devices, the computing system may generate a one-time password for each of said invitees, which may be used to access the electronic document. These passwords may be transmitted to the second client devices as part of the invites or in messages separately from the invites.

In operation 406, the computing system receives, from at least one of the second client devices, a second indication of approval for the first electronic document in the first state. That is, one or more of the users associated with the second client devices provides their indication of approval for the first electronic document and its contents. The users may retrieve the electronic document to save locally or review the document at its stored online location, and provide their indications of approval via their respective client devices. The individual indications of approval may be logged. The computing system may track all of the indications of approval provided by interested parties for a particular electronic document. For example, the computing system may track the state, timestamp, and source associated with each of the received indications of approval for an electronic document. The status of approvals for a document can thus be monitored. In particular, the computing system may be able to track, at specific points in time, which of the invitees have approved a document and which have not.

The computing system may be configured to send copies of a document in the approved state to those devices providing indications of approval for the document. For example, the computing system may send, to one or more of the second client devices, messages evidencing receipt of the indications of approval for the first electronic document in the first state. Such messages may include a copy of the document in the state in which it was approved by a user of a respective second client device.

In operation 408, the second indications of approval for an electronic document are validated. For each indication of approval received from a second client device, the computing system may check to verify the identity of the user providing the indication of approval from the second client device and the permissions of said user to review, edit, and/or sign the electronic document. Other checks may also be performed. For example, the computing system may check device information (e.g. device identifier, IP address, etc.) associated with those second client devices from which the indications of approval are transmitted, to ensure that indications are accepted only from devices corresponding to actual invitees. Location information associated with the second client devices may also be verified (for example, by comparing with locations of known invitees) in operation 408.

In operation 410, in response to validating the second indications of approval, the computing system submits a locked form version of the first electronic document to a virtual document signing ceremony. For example, a locked form version of the first electronic document in the first state may be submitted to the signing ceremony. A locked form version refers to a copy of an electronic document that is non-editable. The locked form version may be in a document format that does not permit any changes or edits (e.g. portable document format) to content of the document. The locked form version captures a final state of a document that has been approved by the interested parties to the document.

In at least some embodiments, a consensus may be required among all of the interested parties to a document (i.e. initiating first user as well as all invited collaborators) in order for the document to be submitted for signing by the approving parties. Thus, in operation 410, the locked form version of the first electronic document in the first state may be generated only upon receiving indications of approval from all of the one or more second client devices (corresponding to the invitees). If at least one of the invitees does not provide an indication of approval, the electronic document will not be signed.

Figure 5:
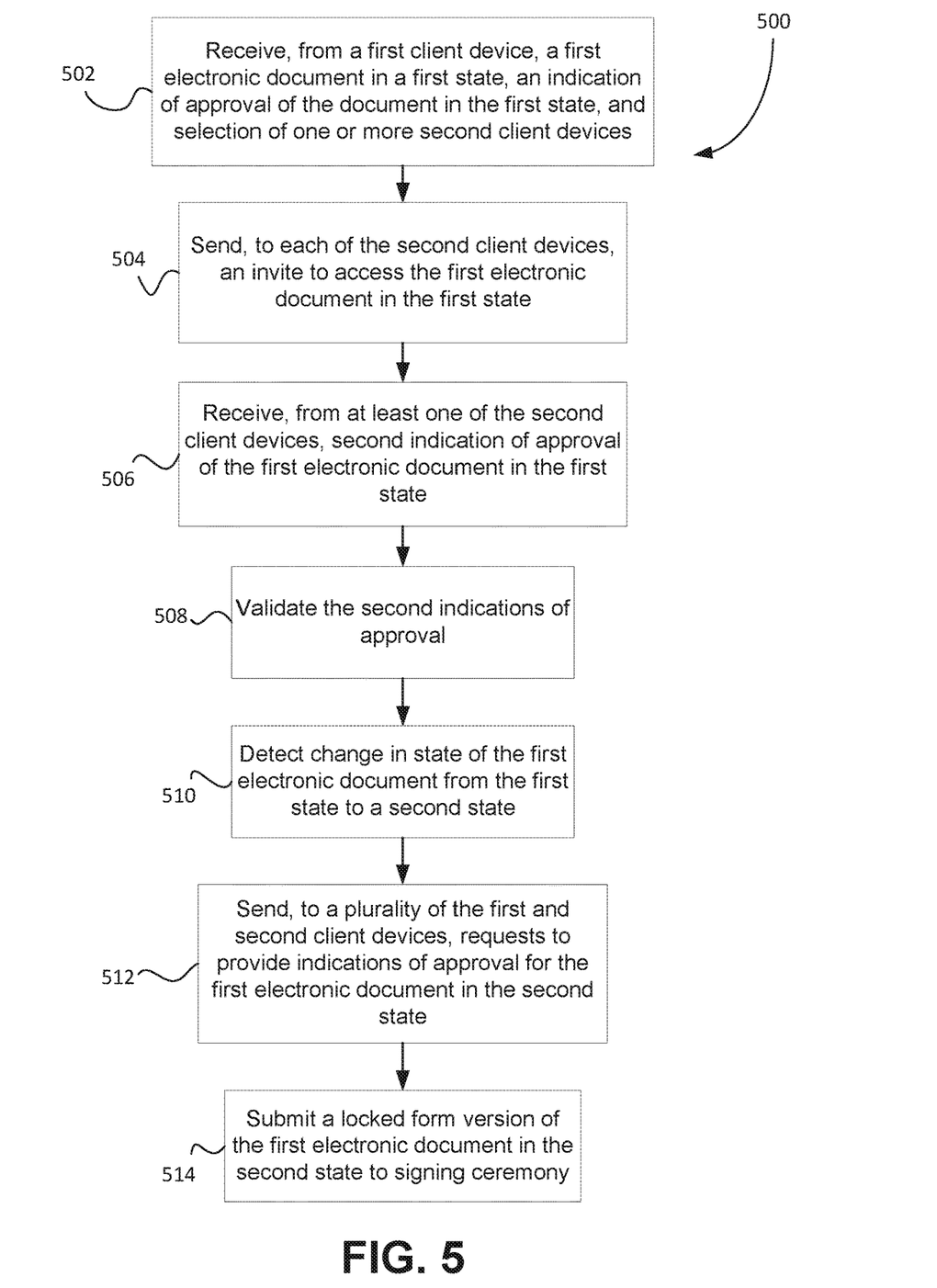
FIG. 5 shows, in flowchart form, another example method for facilitating multi-party signing of an electronic document.

Reference is now made to FIG. 5, which shows another example method 500 for facilitating multi-party signing of an electronic document. The method 500 may be performed by a computing system implementing an electronic signatures platform (such as ESP 130) and which is communicably coupled to a plurality of client devices corresponding to interested parties to an electronic document.

In operation 502, the computing system receives, from a first client device, a request to participate in a multi-party signing procedure for an electronic document. The computing system receives, at least, a first electronic document in a first state, an indication of approval of the document in the first state, and selection of one or more second client devices corresponding to invitees for collaboration on the first electronic document. The first client device may request that invitations to collaborate on the first electronic document be sent to the selected second client devices. In operation 504, the computing system sends, to each of the selected second client devices, an invite to access the first electronic document in the first state. The invites include, at least, a link to access the first electronic document, for reviewing the document at a remote online location or for saving locally to a client device.

Once the invites have been sent, the computing system may begin receiving, from one or more of the second client devices, indications of approval of the first electronic document in the first state. The received indications of approval are validated, in operation 508, to ensure that only those indications from authenticated users/devices are accepted.

In addition to reviewing and approving, an invited party to an electronic document may make edits to the document. For example, an invitee may add to, revise, or delete information (e.g. document content) contained in the electronic document. Accordingly, the actions of an invited party may cause the first electronic document to be changed from a first state (of document content, format, etc.) to a second, different state. In some embodiments, a number of client devices that are permitted to concurrently make changes to an electronic document may be limited. For example, only one user/client device may be allowed in a document editing mode, even if access to the document has been granted to a plurality of invitee collaborators.

In operation 510, the computing system detects a change in state of the first electronic document from a first state to a second state. For example, the computing system may detect changes to document data of the first electronic document made by one or more of the invitees. In response to the detecting, the computing system sends, to a plurality of the first and second client devices, requests to provide indications of approval for the first electronic document in the second state. That is, at least some of the client devices, corresponding to the initiator of the electronic signing process and invitee collaborators, are requested to provide approval of the edited/updated state of the first electronic document.

The requests to provide new indications of approval may only be sent to client devices if the changes to the first electronic document are of a specific type. In particular, if a change to the first electronic document is one that is determined not to affect the substance of the approval of document content that is provided by previous reviewers of the first electronic document, the requests for new indications of approval may not be shared with client devices. For example, minor corrections of grammar and spelling, changes in text font and size, and other similar non-substantial edits to the first electronic document may render additional approvals (by interested parties) unnecessary. If the changes are determined to be significant enough to warrant updated approvals, previously obtained indications of approval (i.e. approval of the document in a previous state) may be voided. Alternatively, the requests may be sent in response to detecting any change of the first electronic document.

The requests in operation 512 may be sent selectively to client devices of interested parties to the first electronic document. Specifically, the requests for new indications of approval may be sent only to those client devices that have provided approval of the first electronic document in a previous state different from the second state. The requests may not, for example, be sent to client devices corresponding to parties that have yet to provide any approval of the first electronic document or to those parties that have already received requests for updated approvals for the first electronic document in the second state.

In operation 514, the computing system submits a locked form version of the first electronic document in the second state to a digital signing ceremony, for execution by all of the interested parties to the document.

Figure 6:
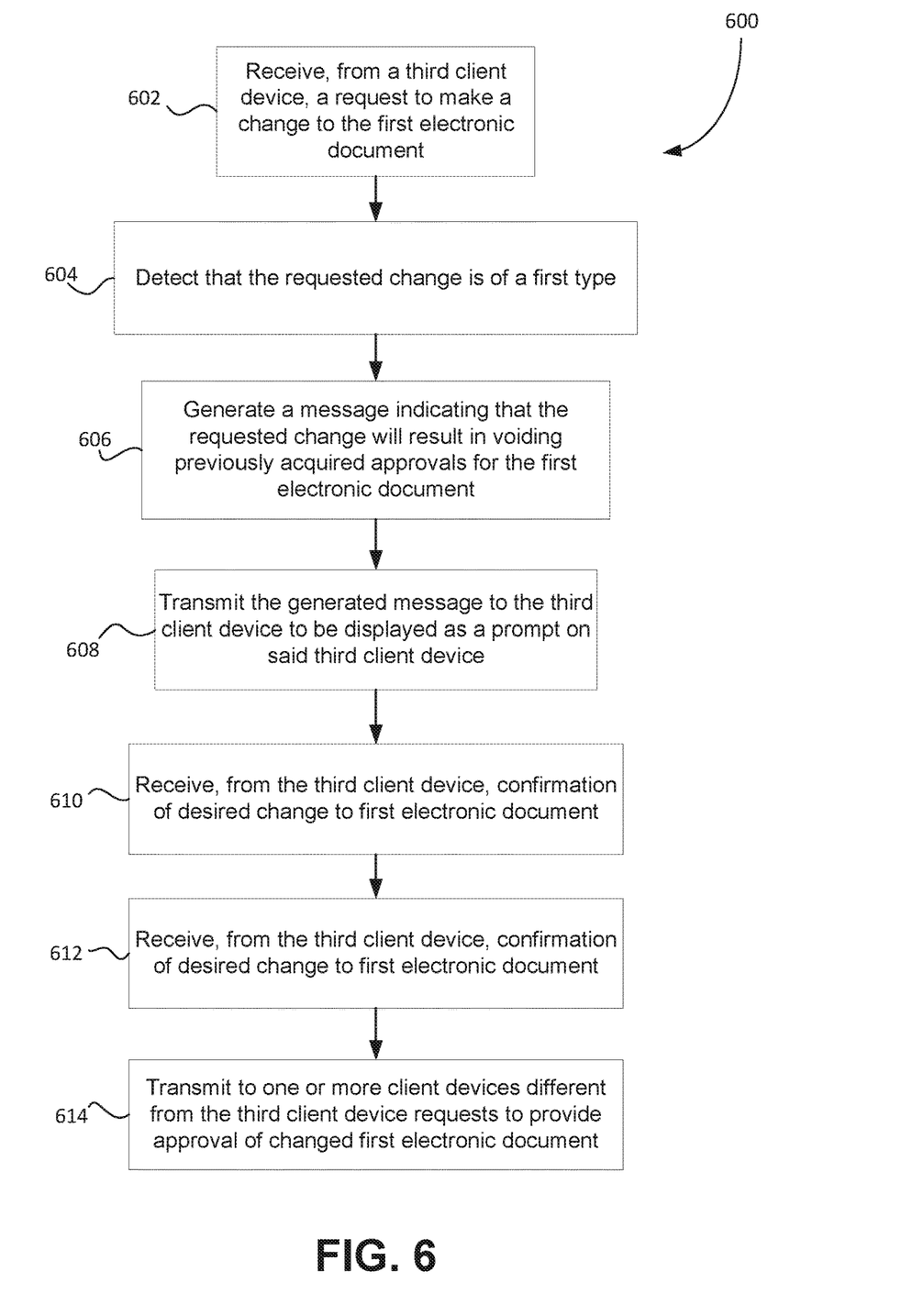
FIG. 6 shows, in flowchart form, an example method for obtaining multi-party approval of an electronic document prior to signing of the electronic document.

Reference is now made to FIG. 6, which shows, in flowchart form, an example method 600 for obtaining multi-party approval of an electronic document prior to signing of the electronic document. The method 600 may be performed by a computing system implementing an electronic signatures platform (such as ESP 130) and which is communicably coupled to a plurality of client devices corresponding to interested parties to an electronic document. The computing system may execute method 600 when handling requests from client devices corresponding to interested parties to an electronic document to make changes to the document.

In operation 602, the computing system receives, from a third client device, a request to make a change to the first electronic document. The first electronic document may be accessible to the computing system (e.g. stored in or accessible to the computing system) such that it may process requests to make changes to the first electronic document and effect those changes directly. For example, an ESP implementation within the computing system may handle such requests for changes to a shared electronic document.

In operation 604, the computing system determines that the requested change is of a first type. More particularly, the requested change to the first electronic document may be determined to be one that is substantively significant, requiring new approvals from those parties that approved previous versions of the document.

The computing system then generates a message indicating that the requested change will result in voiding previously acquired approvals for the first electronic document, in operation 606. The message is then transmitted to the third client device in operation 608, to be displayed as a prompt on the third client device. These steps are intended to notify users of the third client device to carefully consider the effects of the requested changes to the first electronic document, and to weigh those changes against the need to re-obtain approvals for the first electronic document.

In operation 608, the computing system receives, from the third client device, confirmation of desired change to the first electronic document. Once this confirmation is received, the computing system notifies one or more client devices different from the third client device that a change is made to the first electronic document and requests to provide approvals of the first electronic document in the changed/edited state.

Figure 7:
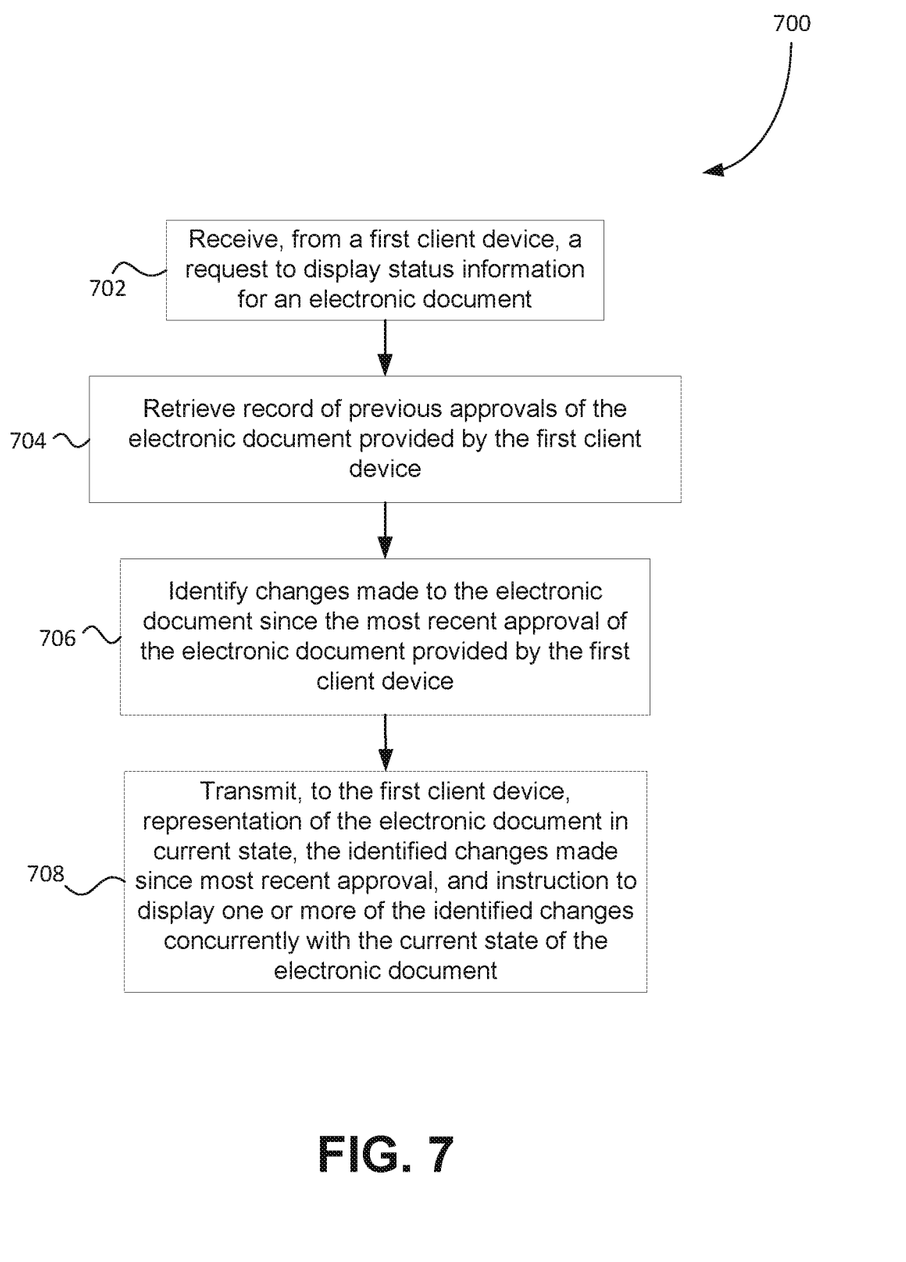
FIG. 7 shows, in flowchart form, an example method for providing a graphical representation of an electronic document for display on a user device.

Reference is now made to FIG. 7, which shows, in flowchart form, an example method 700 for providing a graphical representation of an electronic document for display on a client device. The method 700 may be performed by a computing system implementing an ESP and, in particular, a graphical user interface component such as GUI manager 320 of FIG. 3.

In operation 702, the computing system receives, from a client device corresponding to an invited party to the electronic document, a request to display the electronic document. For example, the client device may request to display the current state, including document data, status of approvals, etc., of the electronic document.

The computing system retrieves records of previous approvals of the electronic document, in operation 704. In particular, indications of approvals of the electronic document in its previous states are retrieved. In operation 706, the computing system identifies changes made to the electronic document since the most recent approval of the electronic document provided by the client device. That is, the information that has changed in the electronic document (e.g. additions to or deletions from document content) since the most recent of the indications of approval provided by a user of the client device is identified.

In operation 708, the computing system transmits, to the client device, a representation of the electronic document in its current state, along with the identified changes made since a most recent approval, and instructions to display one or more of the identified changes concurrently with the current state of the electronic document. The concurrent display of changes with a current version of a document can highlight the activities that took place since the party's latest approval.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

The invention claimed is:

1. A computing device, comprising:
 a communications module communicable with an external network;
 a memory; and
 a processor coupled to the communications module and the memory, the processor being configured to:
  receive, from a first client device:
   a first electronic document in a first state, the first electronic document containing first data in the first state;
   a selection of one or more second client devices;
  send, to each of the one or more second client devices, an invite containing a link to access the first electronic document in the first state;
  receive, from at least one of the one or more second client devices, a first indication of approval for the first electronic document in the first state;
  detect a change in state of the first electronic document from the first state to a second state based on detecting changes to document data of the first electronic document made via one of the second client devices;
  identify a first subset of the first and second client devices including devices that did not provide any indication of approval for the first electronic document and devices that have already received requests for updated approvals for the first electronic document;
  send, to a second subset of the first and second client devices that are not included in the first subset, requests to provide indications of approval for the first electronic document in the second state;
  receive, from the second subset of the first and second client devices, second indications of approval for the first electronic document in the second state; and
  generate a locked form version of the first electronic document in the second state for submitting to a virtual document signing ceremony.

2. The computing device of claim 1, wherein the submitting comprises submitting a locked form version of the first electronic document in the first state.

3. The computing device of claim 1, wherein the processor is further configured to:
 send, to the at least one second client device, a message evidencing receipt of the first indication of approval for the first electronic document in the first state.

4. The computing device of claim 1, wherein detecting the change in state comprises detecting a change to the first data of the first electronic document made by users associated with at least one of the first and second client devices.

5. The computing device of claim 1, wherein the processor is further configured to provide, to at least one of the first and second client devices, details of changes to data contained in the first electronic document that were made since a most recent indication of approval transmitted from the at least one of the first and second client devices.

6. The computing device of claim 1, wherein sending the invite comprises registering a unique one-time password for each of the one or more second client devices for accessing the first electronic document.

7. The computing device of claim 1, wherein the processor is further configured to limit a number of client devices that can concurrently make changes to data contained in the first electronic document.

8. The computing device of claim 2, wherein the locked form version of the first electronic document in the first state is generated only upon receiving first indications of approval from all of the one or more second client devices.

9. A method comprising:
 receiving, from a first client device:
  a first electronic document in a first state, the first electronic document containing first data in the first state;
  a selection of one or more second client devices;
 sending, to each of the one or more second client devices, an invite containing a link to access the first electronic document in the first state;
 receiving, from at least one of the one or more second client devices, a first indication of approval for the first electronic document in the first state;
 detecting a change in state of the first electronic document from the first state to a second state based on detecting changes to document data of the first electronic document made via one of the second client devices;
 identifying a first subset of the first and second client devices including devices that did not provide any indication of approval for the first electronic document and devices that have already received requests for updated approvals for the first electronic document;
 sending, to a second subset of the first and second client devices that are not included in the first subset, requests to provide indications of approval for the first electronic document in the second state;
 receiving, from the second subset of the first and second client devices, second indications of approval for the first electronic document in the second state; and generating a locked form version of the first electronic document in the second state for submitting to a virtual document signing ceremony.

10. The method of claim 9, wherein the submitting comprises submitting a locked form version of the first electronic document in the first state.

11. The method of claim 9, further comprising:
sending, to the at least one second client device, a message evidencing receipt of the first indication of approval for the first electronic document in the first state.

12. The method of claim 9, wherein detecting the change in state comprises detecting a change to the first data of the first electronic document made by users associated with at least one of the first and second client devices.

13. The method of claim 9, further comprising providing, to at least one of the first and second client devices, details of changes to data contained in the first electronic document that were made since a most recent indication of approval transmitted from the at least one of the first and second client devices.

14. The method of claim 9, wherein sending the invite comprises registering a unique one-time password for each of the one or more second client devices for accessing the first electronic document.

15. The method of claim 9, further comprising limiting a number of client devices that can concurrently make changes to data contained in the first electronic document.

16. The method of claim 10, wherein the locked form version of the first electronic document in the first state is generated only upon receiving first indications of approval from all of the one or more second client devices.

* * * * *